United States Patent [19]

Eilert et al.

[11] Patent Number: 4,590,550
[45] Date of Patent: May 20, 1986

[54] INTERNALLY DISTRIBUTED MONITORING SYSTEM

[75] Inventors: John H. Eilert, Wappingers Falls; Arthur L. Levin, Pleasant Valley; Thomas Julian, Poughkeepsie, all of N.Y.

[73] Assignee: International Business Machines Corporation, Armonk, N.Y.

[21] Appl. No.: 509,128

[22] Filed: Jun. 29, 1983

[51] Int. Cl.[4] .............................................. G06F 11/34
[52] U.S. Cl. ................................... 364/200; 364/554; 364/551; 371/16
[58] Field of Search ... 364/200 MS File, 900 MS File, 364/551, 552, 554; 371/16

[56] References Cited

U.S. PATENT DOCUMENTS

| | | | |
|---|---|---|---|
| 3,588,837 | 6/1971 | Rash et al. | 364/200 |
| 3,688,263 | 8/1972 | Balogh, Jr. et al. | 371/16 |
| 3,771,131 | 11/1973 | Ling | 371/16 |
| 3,921,141 | 11/1975 | Wilber et al. | 364/200 |
| 3,988,579 | 10/1976 | Bottard et al. | 371/16 |
| 4,068,304 | 1/1978 | Beausoleil et al. | 364/200 |
| 4,433,412 | 2/1984 | Best et al. | 371/16 |
| 4,471,348 | 9/1984 | London et al. | 364/551 |
| 4,472,784 | 9/1984 | Blachman | 364/554 |

OTHER PUBLICATIONS

IBM Tech. Discl. Bull., vol. 20, No. 11B, "Structure of Performance Monitor for Distributed Computer Systems", by M. S. Helfer, Apr. 1978.

Primary Examiner—James D. Thomas
Assistant Examiner—William G. Niessen
Attorney, Agent, or Firm—Bernard M. Goldman

[57] ABSTRACT

The disclosure provides an embedded hardware/software monitor for a data processing system. It embeds and distributes a plurality of instrumentation table units (ITUs) within various hardware entities in the system to collect sampled hardware signals local in the hardware entity in which the respective ITU is embedded, e.g. in each CPU, I/O processor, system controller, main storage controller, etc. Instrumentation measurement is controlled centrally in the system. Sampling of the system signals is done periodically at a low-rate relative to the CPU machine cycle rate, and the sampled signal are collected in the ITUs for instrumentation analysis. Sampling pulses are synchronously provided in all ITUs in the system. The ITU collected hardware signals are related to software controlled trace entries made in a trace table (TT) in main storage by each CPU in the system executing tracing and other predetermined instructions. An asynchronous relationship between the TT entries and the ITU entries is bridged by the intervening table, called SAT, located in storage. The SAT entries receive time-of-day (TOD) values also found in associated TT entries to relate them.

21 Claims, 8 Drawing Figures

FIG. 3 TRACE INSTRUCTION

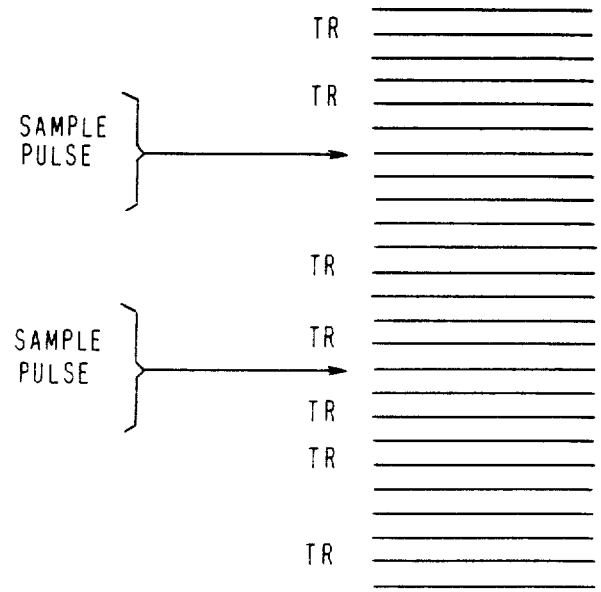
FIG. 4
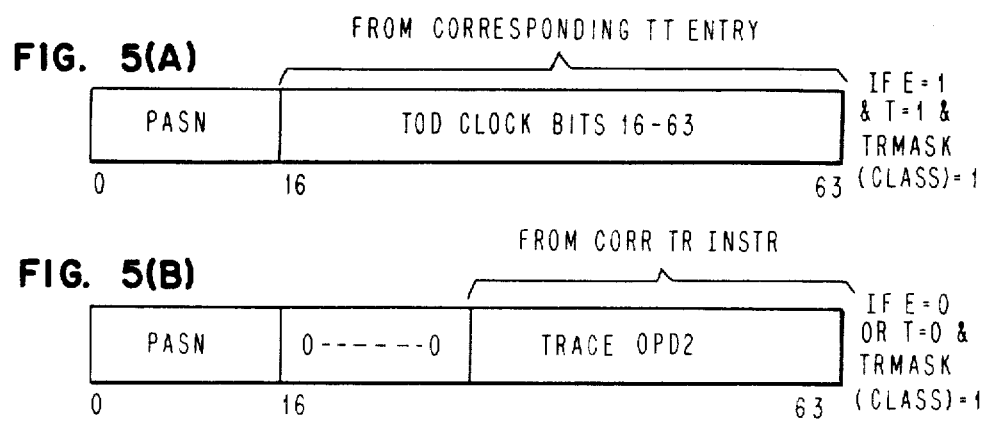

INTERNALLY DISTRIBUTED MONITORING SYSTEM

INTRODUCTION

The subject invention relates to a method and means for internally distributing hardware monitoring entities within a data processing system for sampling and collecting hardware data on the performance characteristics of the system and interrelating the hardware performance data to software monitored data being concurrently collected in the system during the same measurement period.

BACKGROUND

Many computer performance monitoring tools have been developed in the prior art for the purpose of evaluating the performance of computer systems. They have been conceived with various goals in mind. Some of these tools are software, some hardware. The hardware tools are separate from the system they measure, and they are connected to the system by manually-inserted probes or by a plug interface provided for monitoring.

All prior known monitors can basically be divided into two general types: counters and recorders. The counter type counts the number of occurrences of each of a plurality of events, and the counted output usually represents some kind of meaningful information. The recorder type collects data about defined events on recording media. Later analysis of both types is usually needed to make the data meaningful. Early IBM counter type of monitors usually monitored and simultaneously counted specified states in a processor, which were:

1. Total operation time,
2. Channel A operation time,
3. Channel B operation time,
4. CPU operation time, no I/O in process,
5. Tape equipment operation time, CPU in wait state,
6. Card equipment operation time, CPU in wait state.

Software monitors universally have the problem of distorting the operations of the system they are measuring, because software monitors compete with the program being measured for hardware resources in the system.

Monitoring functions may also be separated into two classes: those that sense hook instructions put into a program to assist a monitoring operation, and those that sense some characteristic of a program provided to perform the program function. Non-operable instructions have been inserted as hooks to cause a program interrupt that senses and records a characteristic existing at the time of the offending hook instruction. The monitor call (MC) instruction in the IBM System/370 architecture is provided as on operable instruction for use as a controllable hook in program code. For example, a hook may be put into a programming routine, so that the number of times such hook instruction executes can be counted to determine the number of times that the routine or queue is entered by another program(s). Hardware monitors have been used to sense and count the occurrence of a hook instruction. Monitor functions which have been used to sense non-hook program characteristics, for example, have counted the occurrence of specified instruction operations codes, and plotted the address distribution of accesses to main storage.

Background on monitors and their use is described in a book entitled "Evaluation and Measurement Techniques For Digital Computer Systems" by M. E. Drummond, Jr. published in 1973 by Prentice-Hall, Inc., Englewood Cliffs, N.J.

Examples of patents on data processing system hardware monitors externally connected to a system being monitored are represented by U.S. Pat. No. 3,399,298 to H. M. Taylor entitled "Data Processor Profitability Monitoring Apparatus"; U.S. Pat. No. 3,588,837 to R. D. Rash et al entitled "System Activity Monitor" and U.S. Pat. No. 4,068,304 to W. F. Beausoleil et al entitled "Storage Hierarchy Performance Monitor".

Hardware monitors are being commercially sold, such as the Comten 8028 monitor and the Tesdata monitors.

Another type of monitor is described and claimed in U.S. Pat. No. 4,435,759, filed June 15, 1981 by R. I. Baum et al and assigned to the same assignee as the present invention. It describes a hardware monitor with a software correlation characteristic. It is externally connected to a uniprocessor or multiprocessor system to collect selected hardware events in the system. It relates the collected hardware events to causative software by simultaneously capturing and recording the address of a potentially causative software instruction at the time the hardware events are being sampled for collection. Sampling is done on every nth occurrence of a predetermined hardware event to capture the causative instruction address and the state of one or more other hardware events in the system which may be correlated with the captured instruction address. Hence, the captured instruction addresses relate the simultaneously collected events to the software causing them.

Application Ser. No. 273,530 also discloses a plurality of external monitors respectively connected to plural CPUs in a MP with interconnections between the monitors, and all monitors being connected to an external control processor. The control processor issues read commands to the monitors to synchronize their capturing, and outputting of events in the CPUs being monitored. The control processor in this manner collects the captured events in groups by receiving and recording each group as the set of outputted events resulting from each read command.

SUMMARY OF THE INVENTION

Objects of the invention are:

1. To provide self-contained monitoring for a data processing system built with a LSI technology which prevents user probe connections under the CPU covers to an external hardware monitor, and in which the LSI technology may have an insufficient number of module pins for wiring all required monitor signals to an interface connector for an external hardware monitor.

2. To extend the art of system and program monitoring by distributing and embedding a plurality of instrumentation table units (ITUs) within different major hardware elements of a data processing system, so that the ITUs are local to the hardware events being sampled and collected.

3. To attain hardware monitoring beyond that attainable by: (a) an externally connected hardware monitor, or (b) a software monitoring program, or (c) internally centralized hardware monitoring in the console of a system, e.g. IBM 3033 console.

4. To enable extensive cross-processor monitoring in an MP than is not obtainable with new LSI technology using prior external monitors.

5. To provide a self-contained instrumentation monitoring facility built into a data processing system that correlates sampled hardware signals to related software.

6. To distributively sample and collect simultaneous hardware signals in the system, and one of the sampled signals being the instruction address in the instruction counter of each CPU in the system for enabling a correlation in the collected data with the software containing that instruction address.

7. To distributively sample and collect simultaneous hardware signals including a program address space indentifier and a comment code to relate the hardware signals to a private user's program routine.

8. To distributively collect simultaneous hardware signals and time stamp the collected signals with the execution time-of-day (TOD) of a most recently executed trace instruction, in order to be able to use a comment field in a trace table entry generated by a prior executed trace instruction to relate the collected hardware signals to a particular software routine which caused the hardware signals. The time stamped trace instructions provide a higher level of software resolution than the captured instruction addresses by enabling a comment field in the trace table entries to resolve program identification where user program identification may be ambiguous, such as for instruction addresses in operating systems that simultaneously support plural address spaces with common area routines and data.

The plurality of instrumentation table units (ITUs) are hardware units built into the system at various locations local to the signals being collected by the respective ITUs. Such ITUs may be dedicated to instrumentation, or they may share hardware arrays with diagnostic array units distributed around a system for continuously collecting signals for diagnostic purposes. If arrays are shared for instrumentation and diagnostic purposes, in some situations only one purpose may be invoked at any given time.

The ITUs may be located in the hardware functional elements in a system, such as in each CPU, system controller element (SCE), channel processor, main storage controller element (PMC), etc. There may be more than one ITU in any one hardware functional element; for example, a CPU may have separate ITUs in its instruction unit, in its execution unit, and in its cache control unit (BCE).

While instrumentation is invoked, each ITU samples internal system signals which generally are local to the ITU. Sampling of the system signals is done periodically at a low-rate relative to the CPU machine cycle rate, and the sampled signals are collected in the ITUs for instrumentation analysis. For example, the sampling may have a one millisecond period in a system having a 25 nanosecond machine cycle period. Any of several sampling rates may be selected for a given instrumentation measurement run. A measurement run should be sufficiently long in relation to the sampling period to allow a sufficient number of samples to be collected to have statistical significance for analysis purposes.

Each sampling pulse is distributed to all ITUs in the system to synchronize the collection of signals by all ITUs in the system. Each ITU includes an array with a plurality of entries. A corresponding address is being simultaneously accessed in every ITU array in the system. The address in every ITU is incremented in unison by each next sampling pulse to maintain the addressing synchronism. An initial reset is done on all ITUs in the system to set them all to the same address, e.g. address zero, and thereafter their addresses will be incremented synchronously by the common sampling pulses.

The signals collected in each ITU entry are the signal states recorded in the currently addressed entry at the time a sampling pulse switches the current address to the next entry. This is implemented by allowing all collectable signals received by an ITU to be received by the currently addressed entry. The signal value captured by and collected in a currently addressed ITU entry is the state of the signal existing at the time the sampling pulse switches the ITU to its next address. Thus, the corresponding entries (i.e. entries with the same address) in all ITUs will have their signals captured at the same time throughout the system.

This invention relates the ITU collected hardware signals to software trace entries made in a trace table (TT) in main storage by each CPU in the system. The entry address in a TT is incremented upon each next execution of an enabled trace instruction in the software currently executing on the associated CPU. Therefore, each next enabled trace (TR) instruction causes the generation of a next entry in that CPU's TT. Trace instruction execution occurs asynchronously in relation to the sampling pulses. Hence, entry addressing for any TT is switched asynchronous in relation to entry addressing for the ITUs.

The relationship between the ITU entries and the TT entries is bridged by this invention providing an intervening table, called herein a system area table (SAT). Each CPU may have a SAT and a TT. The SATs may be located in a storage area hidden from the system architected programming interface, called herein system area storage, that is accessible only to microcode and hardware signals, but not to the system control program. The entries in SAT are an extension of corresponding ITU entries. That is, all SATs are address-synchronized with the ITUs by having all SAT addresses also set to zero when the ITUs are reset, and incrementing each current SAT address to each next SAT address in response to each sampling pulse. In theory, the corresponding SAT entry content could instead be put in a corresponding CPU ITU to thereby eliminate the need for any separate SAT in storage. However, the economics of current technology prefers to embody the SAT information in storage rather than by increasing the size of the CPU ITU entries.

The content of a current SAT entry receives the time-of-day (TOD) value provided to the last entry made in the associated TT by the execution of a trace (TR) instruction. The TOD value provides a correlation code between a SAT entry and a TT entry to identify a time relationship. A comment code is also provided in an operand of the TR instruction which is put into the related TT entry to provide a direct way to relate a TT entry to a particular software routine or to a particular place in the routine.

SAT entries are generated while instrumentation is active, even when no corresponding TTs are being generated due to tracing being disabled for a CPU. When tracing is disabled, the TOD value may not be put into the SAT, since no correlation to a TT entry is involved. However, the comment code in a disabled TR instruction seen by the CPU is still acessed by a partial execution of the TR instruction (even though no TT entry is generated), and that comment code put into the SAT entry enables the identification of a particular software routine containing the TR instruction as a hook to thereby provide a link from the hardware signals in the ITU entries to the software routine represented by the comment code in the SAT entry at the same address.

Hence, the commonality of the same TOD value in both a SAT entry and a TT entry forms a relationship between the hardware signals in all ITU entries having the same address as that SAT entry and the software-generated TT entry having the same TOD value found in that SAT entry.

Alternatively (or additionally), the comment field in a SAT entry may indicate a relationship between the hardware signals in all (or some of) the ITU entries having the address of the SAT entry and the software which contained the TR instruction generating the comment field.

The comment code could also be provided in each SAT entry while tracing is enabled. However, a SAT entry comment code would be redundant with, and not provide as good program resolution as, the same comment code in an existing TT entry because the comment codes in a TT may be used to trace the pertinency of TR instructions prior to the TR instruction providing the comment code in a SAT entry. That is, many TR instructions may execute with different comment codes between the sampled SAT entries, with all intervening comment codes retained in the TT.

For the purposes of this invention, the TT entries may be made by any form of software tracing control, such as by any type of tracing hook instruction embedded into a software program, or by automatic generation of a tracing entry upon the execution of a predefined instruction type, e.g. branching instructions, or address-space control instructions, etc. The type of trace mechanism used by the invention may be any type, and therefore, may either interrupt or not interrupt the program containing it.

The ITU addressing may automatically wrap back to location zero when its last location is filled. Also, an output signal can be generated whenever the ITU address either (1) passes its ½ filled address, or (2) wraps back. Upon the occurrence of either output signal (1) or (2), the most recently filled one-half of all ITUs and SATs are outputted to respective output buffers, and then they may be put on an I/O device. This manner of outputting alternates between the two halves of all ITU and SAT tables under microcode control.

Since the TTs operate asynchronously with the SATs, the TT output control is also asynchronous with the ITU/SAT output control. The TT output control is under the control of the system control program controlling the data processing system, which may likewise sense when the number of TT entries exceeds some predefined threshold to control outputting of the TT. The TTs may have many more entries than the SATs and ITUs because the TTs may have their entries filled at a faster rate. Other buffer schemes may be used to minimize or eliminate interruption of the instrumentation data collection during an instrumentation run.

The data in the ITUs, SATs and TTs may be analyzed either from the output buffers or from the output I/O devices.

BRIEF DESCRIPTION OF THE DRAWINGS

FIG. 4 represents a CPU instruction stream containing trace (TR) instruction hooks and an exemplary time of occurrence of sampling pulses in relation to the instruction stream.

FIG. 5 shows two different forms for entries in a hidden storage table (SAT).

DETAILED DESCRIPTION OF THE PREFERRED EMBODIMENT

Figure 1:
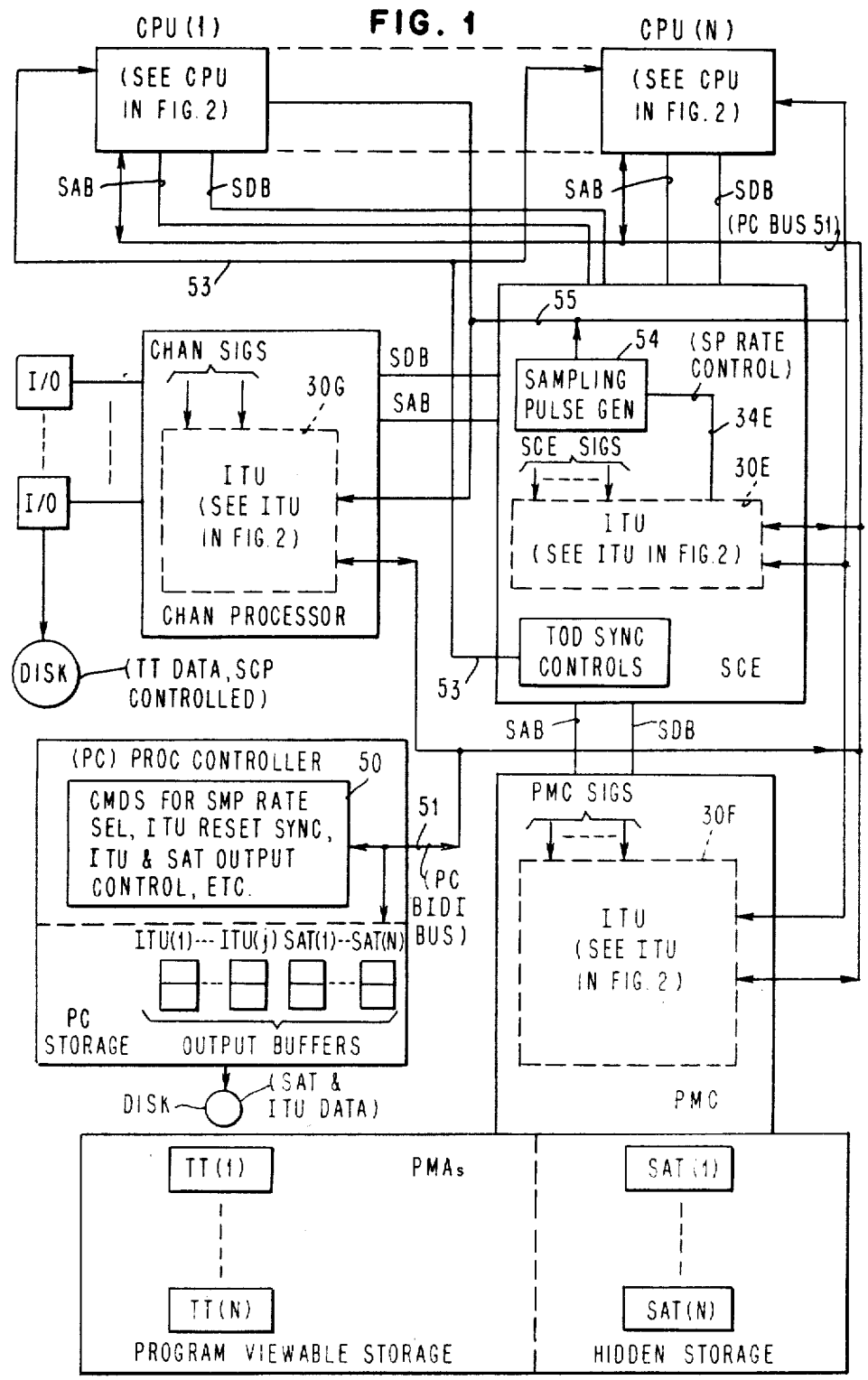
FIG. 1 represents a multiprocessor (MP) system containing an embodiment of the subject invention.

FIG. 1 represents an MP having a plurality of CPUs comprising CPU(1) through CPU(N). Each of these CPUs is represented in more detail by FIG. 2 where it is shown that each CPU contains an ITU (instrumentation table unit) 30.

The system in FIG. 1 also contains a SCE (system control element), a channel processor, a processor controller (PC) associated with the system console, a PMC (processor memory controller) associated with main storage, and PMAs (processor memory arrays) comprising main storage which includes a programmer viewable main storage and a hidden area of main storage accessible by microcode and hardware controls but not from the program interface of the system.

A storage address bus (SAB) and a storage data bus (SDB) provide a storage path from the channel processor and from each CPU to the SCE which controls the switching of storage requests and their data on all storage address busses to the PMC which controls the PMAs comprising the main storage and the hidden storage area. The hidden storage area (SA) contains a plurality of tables SAT(1) through SAT(N). The program viewable storage contains a plurality of trace tables, TT(1) through TT(N), for N number of respective CPUs. The subscript for each TT and SAT relate them as a pair to a CPU.

Figure 2:
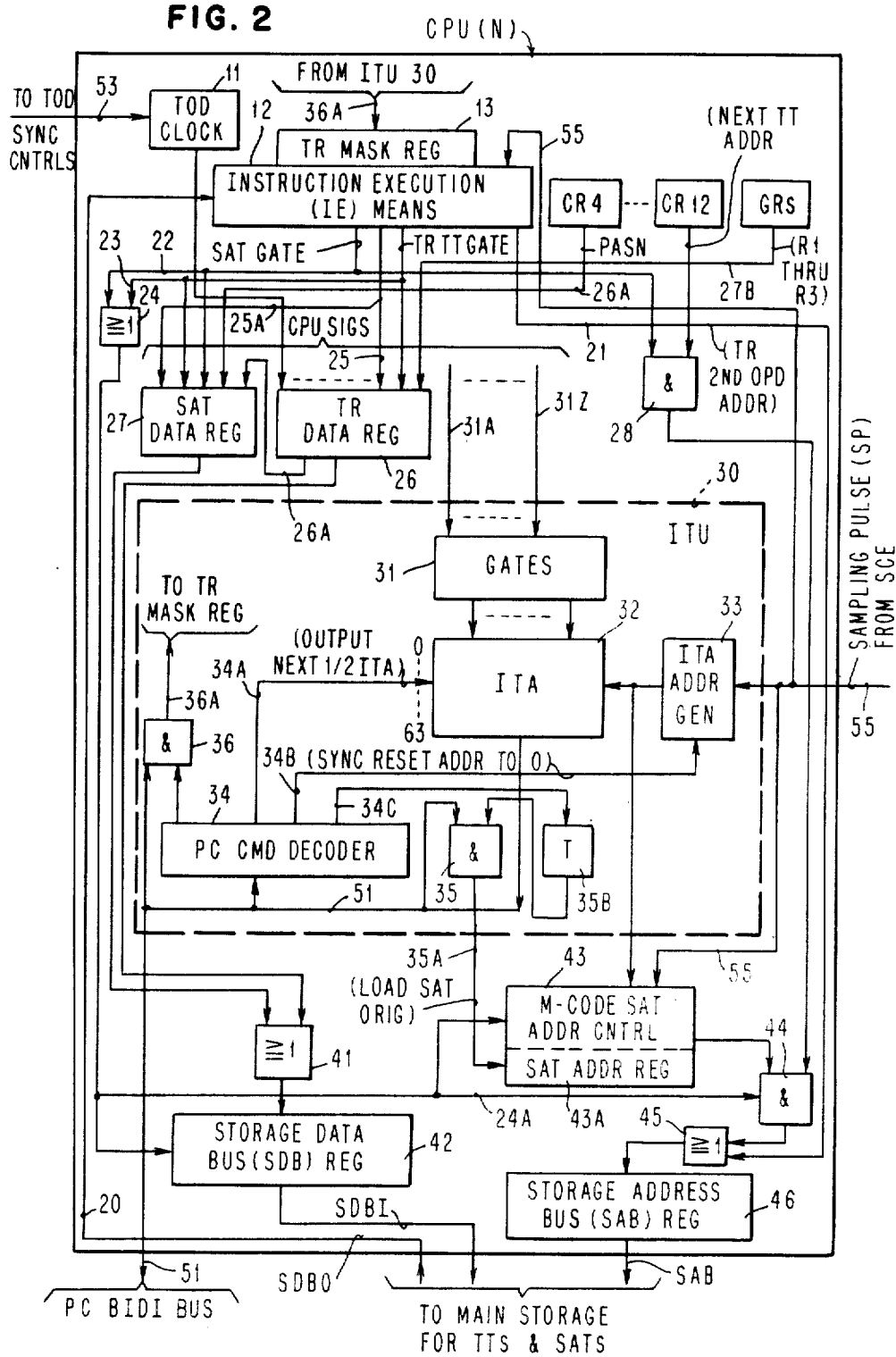
FIG. 2 illustrates in more detail a structure for an important part of the embodiment of the subject invention found in each of the CPUs shown in FIG. 1.

In FIG. 1, the SCE contains an ITU 30E which is essentially the same as the ITU 30 in the CPU illustrated in detail in FIG. 2. The SCE also includes TOD synchronization controls 52 which synchronize all of the TOD clocks 11 in the CPUs via signals provided on a bus 53 that connects to all of the TOD clocks, so that the TODs 11 in all CPUs record the same time of day.

Also, the SCE contains a sampling pulse generator 54 which distributes the sampling pulses on a line 55 that connects to each ITU in the system. ITU 30E also includes an output line 34E from its PC command decoder which detects a PC command for controlling the sampling pulse rate in generator 54. The signal on line 34E may select any of a plurality of pulse rates for sampling pulse generator 54 such as 1, 2, 10, 50 or 300 milliseconds.

The channel processor provides the subchannel controls for the I/O in the system and also contains at least one ITU 30G which receives and collects internal channel processor signals. ITU 30G is constructed essentially the same as ITU 30 in FIG. 2 and operates similarly.

The processor controller (PC) supports the console control of the system and generates console commands conventionally provided by the processor controller to the rest of the system. For this invention, it issues additional commands to control activation of instrumentation, sampling rate selection for instrumentation, ITU reset synchronization for simultaneously setting all ITU arrays in the system to their zero address, and ITU and SAT output control commands for causing all of them in a predetermined sequence to output their last-filled half to a corresponding buffer area in a storage.

Because of the statistical nature of data collected by this invention, the ITUs and SATs are designed so that they automatically wrap-around their addresses back to address zero whenever they fill their highest address. The processor controller will output the content of its output buffers to disk or tape after the half buffer transfers from each SAT and ITU to the PC storage buffers have completed, so that large amounts of data may be collected on an I/O device for later analysis.

This invention also may use trace tables (TTs) generated in program viewable storage by each CPU. To do this, the instruction stream on any CPU may contain tracing instructions, which are any instructions which when executed generate, or cause the generation of, an entry in a trace table in main storage. Trace entries may be generated by any means, explicitly by trace instructions, or implicitly by microcode, for a non-tracing instruction. Hook instructions have been used for tracing, such as by the insertion of an invalid operation code in an instruction stream to create an interrupt that calls a trace entry generation routine, or by a special instruction such as the System/370 monitor call (MC) instruction which causes a similar type of interrupt in the programmed instruction stream.

When the content of any TT is sensed to be one-half full, it can be outputted to a disk buffer area by the system control program (SCP) for the MP using normal I/O programming control of a subchannel of the channel processor, so that the TT data can be preserved on I/O for the later analysis.

An instrumentation run of the MP is performed by enabling an instrumentation state trigger in at least one CPU of the system, and preferably in all CPUs in the system. Also, tracing is preferably, but not necessarily, enabled during an instrumentation run to provide additional instrumentation data under this invention. Tracing is enabled for each CPU by loading a control register (CR12) with a trace table address and TT enablement bit states.

After an instrumentation run is completed, or even during an instrumentation run, a statistical analysis program can receive the SAT, ITU, and TT data from their I/O devices (or storage buffers) and analyze the data to determine whether the system control programming is operating efficiently on the system hardware configuration. The analysis may suggest modifications to the system control programming or to the system hardware configuration, or a part thereof to be modified or repaired to enable the system to perform more efficiently.

Since the sampling pulses occur at a low rate compared to the machine cycle rate, a statistically significant number of samples must be collected during an instrumentation run in accordance with well known statistical principles in order for reliable results to be obtained from the collected data. This requires a minimum time duration for an instrumentation run which is predetermined as a function of the selected sampling pulse rate.

For example, if the collected ITU entries indicate over a relatively large number of samples that cache misses, or cache cross-interrogate hits that are forcing castouts, are occurring at a higher percentage than expected, then the program mix in the CPUs (determined from the collected data of the associated TTs) may indicate how the system control program, or its parameters, may be modified to decrease the number of cache misses to improve the system operating efficiency.

FIG. 2 illustrates those circuits within each CPU which are important to the subject invention. It is obvious that any CPU contains a tremendous amount of circuitry of a conventional nature to perform normal functions of the CPU not important in describing an embodiment of the subject invention, and they are not shown or discussed herein because they would clutter the communication of the inventive concepts. Thus, in FIGURE 2 each CPU has a TOD (time of day) clock 11, instruction execution (IE) means 12, a TR mask register 13, control registers (CRs) 0 through 15 of which CR4 and CR12 are shown, GRs (general purpose registers) 0–15, a TR data register 26, a SAT data register 27, an ITU 30, microcode SAT address controls 43 containing a SAT origin register 43A, a storage data bus (SDB) register 42, a storage address bus (SAB) register 46, and interconnecting circuitry representations.

ITU 30 comprises gates 31 which receive a plurality of signals 31A through 31Z preselected from the local CPU and gate the signals into a currently addressed entry in an ITA (instrumentation table array) 32 at an address currently being selected by an ITA address generator 33.

The ITA 32 in this embodiment is a hardware array containing 64 entries in which only the currently addressed entry is enabled to receive inputs from gates 31. ITA address generator 33 may be a six position binary counter in which the binary output is decoded within generator 33 to select the currently enabled entry in ITA 32 that is receiving the CPU signals from lines 31A–31Z. Any new signal on any line 31 will overlay the previously provided signal from the same line in the currently addressed entry until generator 33 is switched to the next array address by a sampling pulse on line 55. The address switching disables the inputting of further signals to an inputted entry to thereby cause that entry to collect the last value of the signals on lines 31A–31Z provided just before address generator 33 switched the address to the next entry. In this manner, each array entry is loaded with a collection of instrumentation data upon each next sampling pulse received on line 55, which accordingly increments generator 33 to its next address.

Each ITU in the system contains a PC (processor controller) command decoder 34, which receives commands on a PC bidirectional bus 51. Each of these commands is comprised of a different bit combination which is decoded by decoder 34 so that different commands activate different ones of its output lines 34A, B, C, etc.

ITU 30 in FIG. 2 is typical of all ITUs in the MP in FIG. 1, with certain variations for ITUs which are not in CPUs, primarily in outputs of PC decoder 34 for other PC commands. Thus, only the CPU ITU 30 in FIG. 2 can decode a set trace mask command to set a trace mask in trace mask register 13 of a CPU. Non-CPU ITUs do not decode the trace mask command since non-CPU elements do not have a trace mask. The SCE ITU 30E likewise has a decoder 34, but it alone decodes a sampling rate select command. For instrumentation initialization, PC commands set an instrumentation active state trigger 35B and initially load SAT address register 43A with the location of that CPUs SAT in the hidden storage area. These commands are received and decoded by PC command decoder 34.

A PC command received by all ITU decoders 34 can enable or disable instrumentation throughout the entire system. If disabled, no instrumentation signals are collected in the ITUs of the system, and no SAT tables are generated. Enablement can be selective on an ITU basis, enabling some ITUs and disabling others. Generally, all ITUs are either enabled or disabled together.

The decoded command signal on line 34B in every ITU in the system resets generator 33 to its zero address state, which enables all ITUs in a system to be simultaneously set to their zero address to initially synchronize the operation of all ITAs in the system.

An output command on line 34A in every ITU in the system causes ITA 32 to output the content of either its upper half or lower half, whichever was last filled beginning with its lowest address entry. The data in the ITA is outputted to the same bidirectional bus 51 to the PC, where the data is stored in the corresponding half of an output buffer in the PC storage.

A load SAT command is decoded on line 34C to activate a gate 35 to pass a sequence of bits being provided on bidirectional bus 51 to a SAT address register 43A in a CPU. The command sets register 43A with the address origin in the hidden area in main storage.

A set TR mask command to an ITU 30 in any CPU loads its TR mask register 13 via a line 36A from a gate 36 which operates from decoder 34 similarly to gate 35. Thus, when a set TR mask command is detected by decoder 34, it conditions gate 36 to pass a next set of bits to line 36A which loads them into trace mask register 13.

Figure 3:
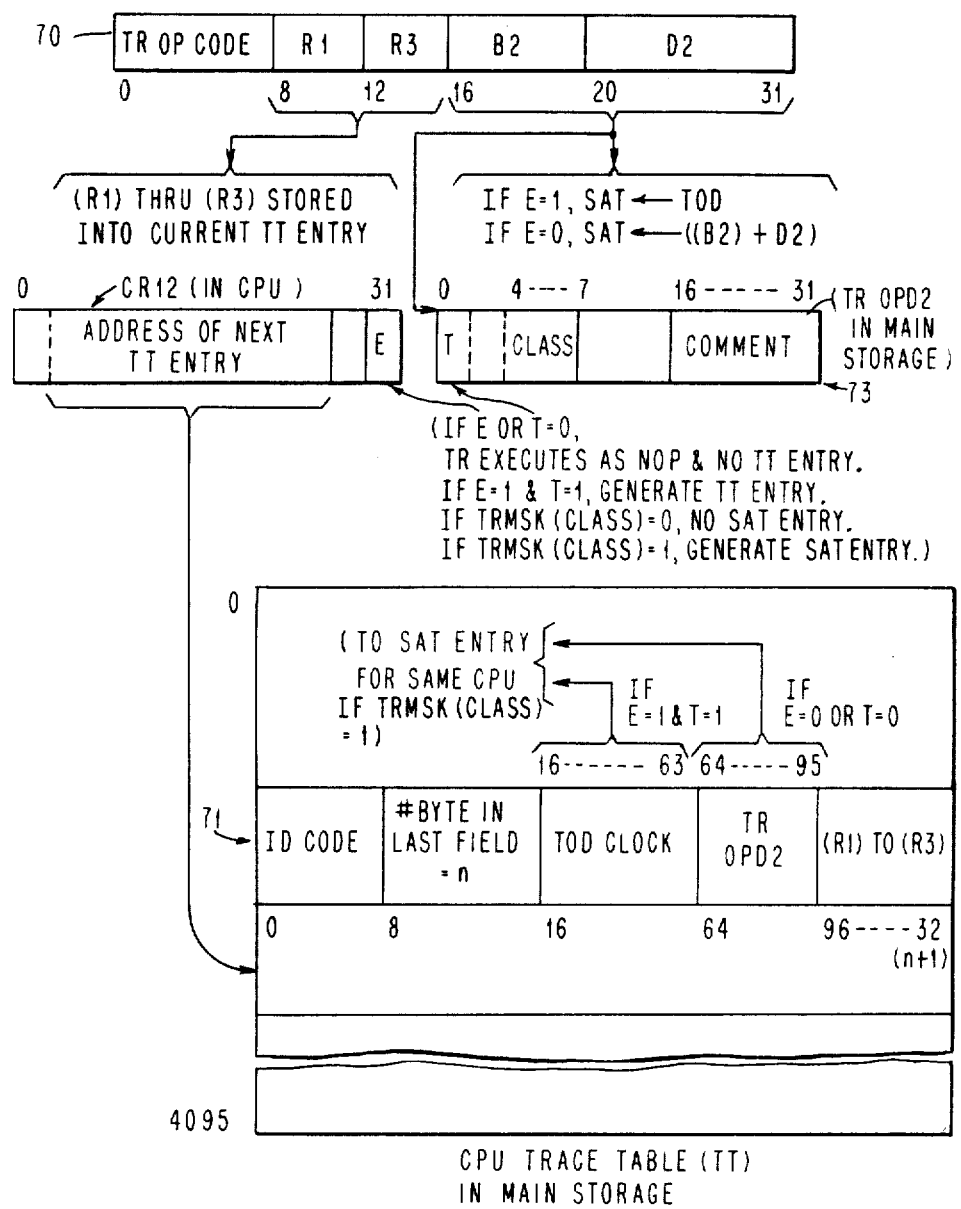
FIG. 3 represents an architecture for a trace (TR) instruction used by the preferred embodiment.

The instruction execution (IE) means 12 interprets and executes the instruction stream of the CPU in the conventional manner, except as otherwise stated herein for a unique trace (TR) instruction which does not interrupt the instruction stream like other hook instructions. The architecture of this type of TR instruction is shown in FIG. 3. The CPU execution of a TR instruction in FIGURE 2 involves providing the TR second operand adress (after any translation) on bus 21 via an IR circuit 45 to SAB register 46 to access the second operand in the CPU cache or, if not in the cache, from the program viewable main storage. A storage data bus out (SDBO) 20 receives data from the cache (or from main storage) and transfers it to the instruction execution means 12.

Then the IE continues the TR instruction executing by gating the TOD value from clock 11 to a TR data register 26 and from register 26 on lines 26A into SAT data register 27. Also the IE transfers the contents of registers R1 through R3 into register 25, and counts the number of bytes therein. This byte count is then transferred to a respective field in register 26. The IE also generates an ID code to identify the TR instruction type from its operation code, and sets the ID code into register 26. The IE issues a plurality of TR TT gate signals on line 23 in FIG. 2 to gate these signals into and out of register 26 to SDB register 46 in doubleword groups while doing doubleword increments to the address in SAB register 46 for data transfers to an entry 71 in FIG. 3 in the TT for the respective CPU.

The current TT entry in main storage begins at an address being provided from CR12 through gates 28 and 44 and through OR circuit 45 and SAB register 46 to the CPU cache and/or main storage. The TT address in CR12 is incremented for each doubleword transfer and when the doubleword transfers for an entry are completed, the content of CR12 will point to the next TT entry.

In this embodiment, a valid entry is written into SAT on the occurrence of a sampling pulse only when at least one TR instruction was observed in the instruction stream since the prior sampling pulses, while instrumentation is active and the class field in the TR instruction was enabled by the TR mask. If any of these conditions does not exist, then this embodiment leaves an invalid entry in SAT by incrementing the SAT address without having written anything into that entry.

This is implemented in FIG. 2 by operation of the microcode SAT address controller 43 which contains the microcode controls for generating each next address to be accessed in the SAT when the next sampling pulse is received from line 55. The microcode in controls 43 generates the next SAT address by adding the current SAT entry address (received from ITA address generator 33) to a SAT origin address in register 43A.

Upon the execution of a TR instruction, the content of the next SAT entry is collected in FIG. 2 in a SAT data register 27 and is written into the currently addressed SAT entry when a SAT gate signal is provided by IE means 12 through an OR circuit 24 on a line 24A to microcode controls 43. That is, a gate circuit 44 is actuated by the signal on line 24A to transfer the next SAT address from controls 43 through an OR circuit 45 to a storage address bus (SAB) register 46 in response to a gating signal on a line 24A. The address in register 46 is transferred to main storage on the storage address bus (SAB) to locate the SAT entry in which the data from a SAT data register 27 is written after it is transferred through an OR circuit 41, and a storage data bus (SDB) register 42 to a storage data bus in (SDBI).

The IE SAT gate signal on line 22 is generated by the execution of an enabled TR instruction. The SAT gate signal enables register 27 to receive the content of CR4 (which is the current program address space number, PASN) and either the TOD clock value 11 or the TR second operand, in accordance with the flow diagram shown in FIG. 7. (Alternatively, the PASN can be written into the current SAT entry each time any instruction writes a PASN into CR4.) Then on the next sampling pulse, the SAT data in register 27 is transferred to the SAT for this CPU in hidden main storage.

Figure 7:
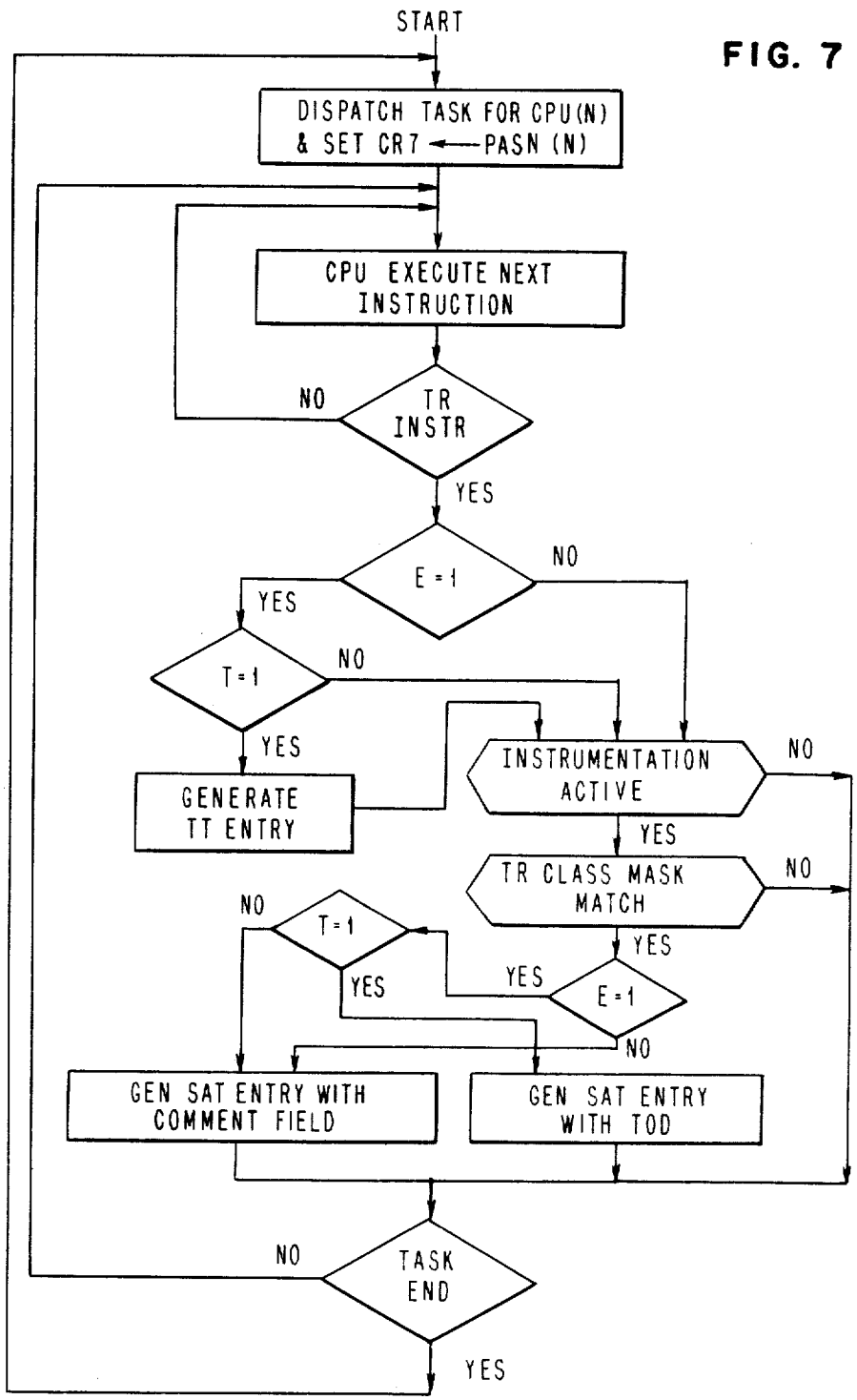
FIGS. 7 and 8 are flow diagrams illustrating overall operational control of the preferred embodiment in any CPU of an MP.
Figure 8:
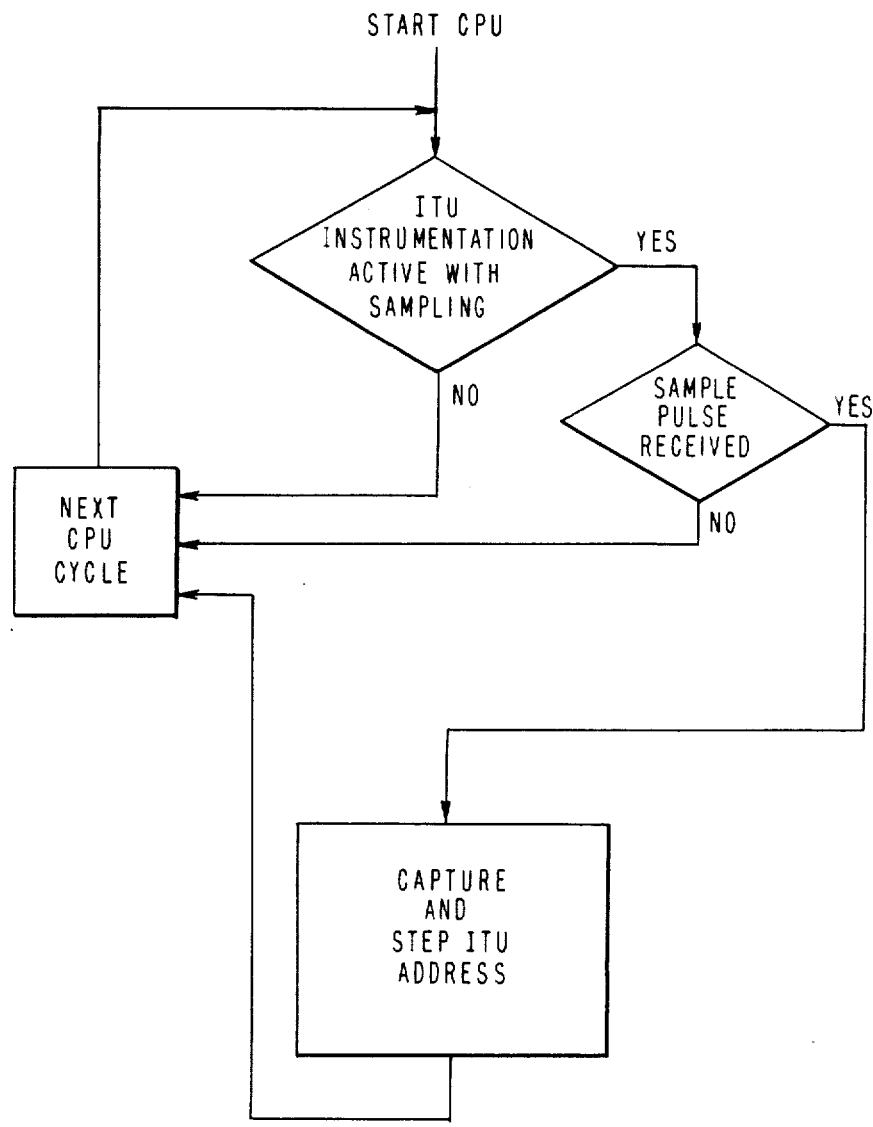

FIGS. 7 and 8 provide flow diagrams which show the instrumentation and tracing enablement control operations for generating the entries in the TT, SAT and ITUs for a particular CPU. Non-CPU ITUs may be enabled for instrumentation if any CPU is enabled for instrumentation.

The SAT entries have the form shown in FIG. 5(A) or 5(B). If trace table generation is enabled, valid SAT entries have the form shown in FIG. 5(A). If TT generation is disabled, the SAT entries have the form shown in FIG. 5(B). In the latter case, the TOD value is not copied into either register 26 or 27 by the IE, but instead the IE writes into register 27 on lines 26A the TR instruction's second operand (which includes a comment field) copied from bit positions 16–31 in the second operand field in register 26 each time a TR instruction is executed.

FIG. 4 represents an instruction execution sequence in any CPU of the system. Each line in the sequence represents an observed instruction in the execution stream.

FIG. 3 illustrates the architecture of a unique and preferred type of trace (TR) instruction 70 which may be used in the instruction stream shown in FIG. 4. The circuits previously described in FIG. 2 control the transfer from the CPU of the fields put into each entry 71 in a TT for the respective CPU. The TR instruction 70 includes an operation code, general register fields R1 and R3, and a second operand address field B2, D2. The R1 and R3 fields define a sequence of general register contents (R1) through (R3) which are stored into the current trace table (TT) entry 71 at relative byte locations 96 through 32(n+1) from the beginning of that entry. The B2 and D2 fields in the trace instruction define a logical storage address which, after translation, locate a second operand word in a predetermined area in main storage, which is fetched to the IE and then is transferred into the current TT entry 71 at byte locations 64–95.

The current entry 71 is written into the TT only if an E bit in CR12 and a T bit in the second operand are both set to 1. Then all of the fields are written into current entry 71 including the TOD clock content existing at the time of execution of the respective TR instruction 70, which is transferred into byte locations 16–63 in the current TT entry 71. The field at byte locations 8–15 receives a count generated in the IE of the number of bytes in the variable-length GR content field from 96–32(n+1). Also an ID code is generated in the IE and is inserted into byte locations 0–7 in the current entry 71 to represent the type of trace entry being written when the system is capable of writing other TT entry formats than that shown for entry 71.

The content of CR12 in each CPU contains the address of the next entry in the TT for that CPU. CR12 also contains a flag bit E which controls the general enablement of tracing by the respective CPU. If flag bit E is set to 0, each TR instruction observed in the execution stream of that CPU will be treated as an nop (no operation), and no TT table will be generated. While the E flag bit is set to 1, the TR instructions are executed. However, corresponding TT entries will not be generated and written into the TT table for the respective CPU unless the T is set to one for the particular TR instruction being executed.

In this regard, the TR second operand 73 (fetched from the B2, D2 address in main storage) contains two enablement control fields for the respective TR instruction, which are the high-order bit T and the class field at bit positions 4–7. For any particular TR instruction, the bit T enables or prevents the generation of a corresponding TT entry. If T is set to 0, the IE unit treats the trace instruction as a TT entry nop, in which case no entry is generated in the trace table for that TR instruction. Whether the T bit is set to 1 or 0 state, an entry is written in the SAT only if the class field content indexes to a mask field bit set to a 1 state in TR mask register 13 in the CPU (see FIG. 2). The content of the TR mask register 13 was previously loaded therein by a PC command as described in FIG. 2. That is, the four bits of the class field are decoded by IE into a number between 0 and 15 which is used as an index from the high-order end of register 13 to locate a bit position in the mask field in register 13, and if that mask bit position is set to 1, the SAT entry is written.

Thus, flag bit E controls the general tracing enablement for the TR instructions in the CPU instruction stream. SAT is controlled by the TR mask in register 13 to disable one or more classes of TR instructions from generating SAT entries. And in any enabled class of TR instructions, the flag bit T can disable the TT entry generation for any particular TR instruction.

FIG. 7 defines the controls used in the preferred embodiment for controlling the form of each entry in any SAT in relation to TR instruction tracing. The SAT for a CPU is enabled only when instrumentation is activated by the PC. Then a valid entry is only written into SAT if an immediately preceding TR instruction had a class mask match. The state of flag bit E in CR12 of the respective CPU only controls the form of a SAT entry. If the E flag bit is set to a 1 state to enable tracing and the T bit is set to a 1 state, the SAT entry format shown in FIGURE 5(A) is generated, which contains the TOD value obtained for the last executed TR instruction. If the E flag bit is set to 0 state to disable TR tracing or the T flag bit is set to 0 state (i.e. no TR trace table entry is generated), a SAT entry is nevertheless generated; but the SAT entry will have the form shown in FIG. 5(B) containing the second operand of the last observed TR instruction (which did not generate a TT entry). That is, the last observed TR instruction was a nop in regard to any TT operation, but that TR instruction was nevertheless partially executed for SAT entry generation by fetching the second operand of the observed TR instruction for the next SAT entry. Thus, while instrumentation is enabled, every TR instruction is executed at least partially by the instruction execution unit for the purpose of determining whether to generate a SAT entry even when tracing is disabled and TT entries are not being generated. Therefore the TR execution requires at least the fetching of the second operand and the testing of the class field in the second operand against the tracing mask in the CPU register 13.

Figure 6:
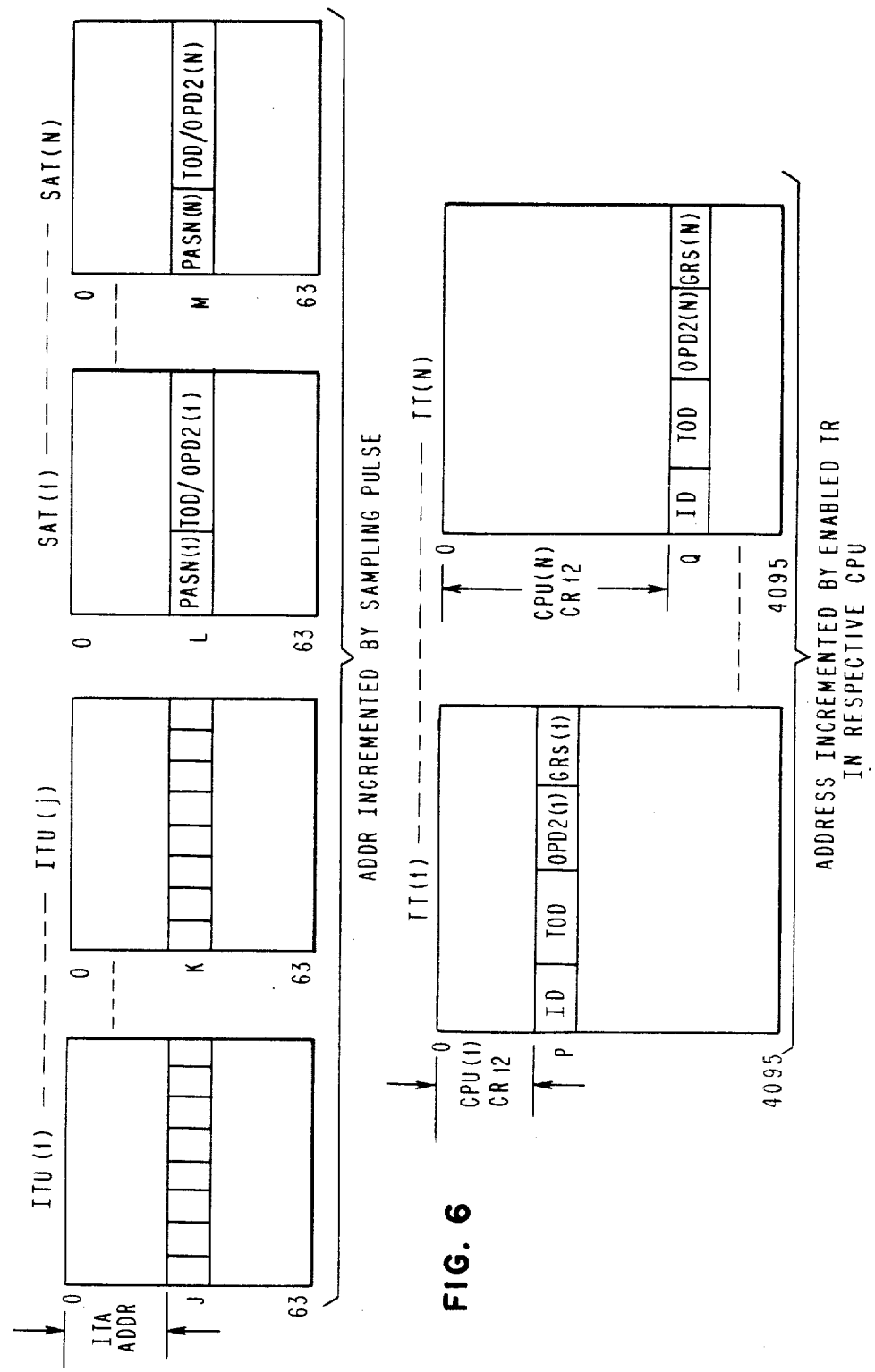
FIG. 6 illustrates the entry address relationships among different tables used by the subject embodiment of the invention.

FIG. 6 is a diagramatic representation of the different types of tables which may be collected in the system and their address synchronizations and asynchronizations. The system has N number of CPUs, and j number of ITUs. It is apparent in FIG. 6 that all of the ITU and SAT tables are synchronously addressing a corresponding address in each of their tables, ITU(1) through ITU(j) and SAT(1) through SAT(N). It is also apparent that each of the trace tables, TT(1) through TT(N) is controlled by different next address values in the different CR12 of the respective CPU(1) through CPU(N), which are executing different instruction streams. Hence, the TTs are asynchronously addressed with respect to each other and with respect to the ITU and SAT addressing.

Each SAT is an extension to the ITA in the corresponding CPU. This invention also teaches that the SATs can be eliminated in main storage by integrating the SAT collected information into a corresponding CPU ITA by adding three additional fields in the entries of an ITU in each CPU. In the latter case, the PASN, TOD and comment signals are recorded into the currently addressed entry in the corresponding ITA whenever a TR instruction is observed in the instruction stream. The reason this is not done in the preferred embodiment is economic (although it is not difficult technologically), because the ITA array costs are at this time much greater than generating a corresponding SAT in a hidden area of main storage. If the cost of technology decreases sufficiently in the future, it may become economic to integrate SAT information in the ITAs, and thereby eliminate the SATs.

The reason the SATs are in a hidden storage area is to protect these tables from program error or manipulation, since there is no reason they need to be program viewable. On the other hand, the TTs must be program viewable to allow programmers to trace their programs.

A system operator has great flexibility in the type of instrumentation being provided. The instrumentation can identify a relationship to a program which caused associated hardware signals to be collected by the ITUs. For example, the comments field in the TR second operand can identify particular points in a program routine, or the comments field in all TR instructions in a given program routine can identify the routine, in order to obtain an association between the collected hardware signals and the software causing the generation of the signals. In these cases, it is noted that a software/hardware correlation is obtained without regarding any TOD clock values.

However, the software/hardware correlation can be increased by using TOD values in both the SAT and TT entries. The absolute time aspect of the TOD values may not be important, but rather the unique coding provided by the TOD values are only identical in related SAT and TT entries.

The correlation of software to the collected sampled hardware signals presents special problems when instrumenting complex system control programs which can have plural address spaces simultaneously existing in the system, such as with the IBM MVS/370 operating system. The problem is caused by using the same logical addresses in different address spaces, including in the private areas of the address spaces. The problem is made even more complicated by having users share common system routines and system data in the common areas of all address spaces in the system.

Consequently in plural address space systems, having a CPU ITU merely collect the logical address of sampled current instructions along with the sampled CPU signals may be insufficient to identify which software program or routine actually contained that logical address, since plural programs in different address spaces may use the same logical address.

If the executing software was in the private area of an address space, the PASN captured in the corresponding entry will identify the address space and its user, since the PASN is the address space number and identifies the user of the private area of the address space, to thereby enable a hardware to software correlation for logical addresses in private areas.

However, if the logical address is in the common area of all address spaces, the captured PASN in the corresponding SAT entry may not necessarily identify the user of that logical address (which may be in a system routine available to all users). The corresponding trace table can then be used to discover, without ambiguity, the PASN of the true user. This is done by finding a related TT entry containing the same TOD value as the TOD value in the SAT entry corresponding to the logical address being questioned. Then the comment codes in TT entries prior to the related TT entry are examined to find a TT entry for a dispatcher routine (which is known to have a TR instruction from which a TT entry was generated. It will be known that a TR instruction is embedded in the dispatcher routine at a location in which the true user PASN is contained in a predetermined GR (which contents were written into the (R1) through (R3) field of the dispatcher TT entry). Hence, the dispatcher TT entry will be the first TT entry containing the dispatcher comment code prior to the related TT entry with the TOD value equal to the TOD in the SAT entry corresponding to the logical address being examined. This dispatched PASN does not change until another PASN is dispatched, and therefore the first prior PASN found in this manner in the related TT is the PASN which can be used to identify the true user of a common area software routine which generated the collected hardware signals being examined.

It is understood that the structures of the ITUs are subject to variation in any system using this invention. For example, the PC command decoders may be shared between ITU and other system control functions and therefore be located external to any one or more of the ITUs.

While there has thus been described and illustrated specific embodiments of the invention, it will be clear that variations in the details of the embodiments specifically illustrated and described may be made therein without departing from the true spirit and scope of the invention as defined in the claims.

Having thus described out invention, what we claim as new desire to secure by Letter Patent is:

1. Internal system instrumentation monitoring means for obtaining measurement data on the software/hardware operation of a data processing system having at least one CPU, a channel processor for controlling I/O of the system, and a main storage controller for controlling system main storage, the CPU having an instruction execution unit with an instruction address register for indicating the address of each instruction executed by the CPU, the monitoring means comprising:
   an instrumentation table unit (ITU) being embedded internally within the CPU in local proximity to CPU signals which may be monitored,
   the ITU having an instrumentation table array (ITA) that includes a plurality of entries, each entry being capable of storing an input signal to the ITA while the entry is being addressed,
   means for connecting a selected set of internal CPU signal lines as input signals to the ITA,
   addressing means for selecting a current entry in the ITA and for enabling the current entry to receive and record a current state of the input signals to the ITA,
   sampling signal means connected to the addressing means for providing sampling signals to the addressing means to increment the address to a next entry in the ITA so that the next entry can then receive the input signals,
   means for the input signals to the previously addressed entry when the sampling signal increments the address to the next entry in the ITA,
   wherein a collection of stored input signal states in an entry being determined by the timing of the sampling signal that disables the input signals to the entry, a previously addressed entry receiving input signals thereby becomes a ITA collected entry of stored input signals upon having its input signals disabled, instrumentation control means connected to the ITU to control when the ITU is active for recording the input signals in the ITA, in order to enable the ITA to record a statistically significant number of entries during a period of ITU measurement activity.

2. Internal system instrumentation monitoring means as defined in claim 1, further comprising:
means for signalling when a predetermined set of entries in the ITA contains collected entries,
means for outputting the set of collected entries to an output buffer in response to a signal from the signalling means,
the outputted sets of collected entries from the ITA being stored external to the ITA until the number of set is statistically significant of CPU activity.

3. Internal system instrumentation monitoring means as defined in claim 2, the moinitoring means further comprising:
an extension table (SAT) being provided in an area of main storage,
means for accessing a current SAT entry in the extension table at a relative address which corresponds to a current address in the ITA,
means for recording a value in the current SAT entry by overlaying any value of the same type previously recorded in the current SAT entry, the value last recorded for the current SAT entry at the time of a sampling pulse being the value collected in that entry in the SAT to provide a SAT collected entry,
each SAT collected entry corresponding to an ITU collected entry when both entries are collected by the same sampling pulse at the same relative addresses in the SAT and in the ITU.

4. Internal system instrumentation monitoring means as defined in claim 3, further comprising:
instruction means for sensing a predetermined type of instruction being executed by the CPU,
tracing means for generating a tracing table (TT) entry in main storage in response to the predetermined instruction being sensed by the instruction means,
tracing control means for enabling and disabling the tracing means,
TT entry generation means for generating an entry in the TT when the instruction means senses the execution of an instruction of the predetermined type while the tracing control means is enabled,
the generation means copying a field of the TT entry as a value for the current SAT entry,
the same value in a TT collected entry and in a SAT collected entry relates the TT collected entry to the SAT collected entry and to a corresponding ITU collected entry having the same relative address as the SAT collected entry.

5. Internal system instrumentation monitoring means as defined in claim 4, further comprising:
time-of-day (TOD) clock means in the system,
the instruction means reading a TOD value from the TOD clock means as the value to be recorded in both a current TT entry and in a current SAT entry only if the tracing control means is enabled,
the same TOD value recorded in the SAT entry and in the TT entry relating them to an ITU entry having the same relative address in the ITA as the relative address for the SAT entry in the SAT.

6. Internal system instrumentation monitorting means as defined in claim 5, further comprising:

the tracing means not generating a TT entry upon sensing an instruction of the predetermined type in the instruction stream of the CPU while the tracing control means is disabled,
but the tracing means reading an operand field of the predetermined instruction as a value to be recorded in the current SAT entry in response to the tracing control means being disabled,
the current SAT entry becoming a collected SAT entry containing a value derived from the disabled instruction of the predetermined type last observed in the CPU instruction stream in relation to the time of collection of the content of the collected SAT entry.

7. Internal system instrumentation monitoring means as defined in claim 6, further comprising:
a tracing instruction being an instruction of the predetermined type capable of controlling the generation of an entry in the TT, the tracing instruction having a storage operand,
the instruction means partially executing each tracing instruction in the CPU instruction stream by accessing at least a part of the storage operand of the instruction to derive a value for recording in a current SAT entry when the tracing control means disables tracing by the CPU so that TT entries are not being generated,
the current SAT entry becoming a collected SAT entry containing the storage operand derived value from the last trace instruction observed in the CPU instruction stream in relation to the time of collection of the content of the collected SAT entry while tracing is disabled.

8. Internal system instrumentation monitoring means as defined in claim 7, further comprising:
the tracing instrumentation being enabled by having a CPU controlling trace table enablement bit position (E) set on and a trace instruction operand tracing control bit position (T) set on.

9. Internal system instrumentation monitoring means as defined in claim 8, further comprising:
a plurality of distributed ITUs in a data processing system, the ITUs being located in at least some major distributed hardware entities of the data processing system, including at least in each CPU, in each system control unit (SCU), and in at least one processor controller (PC) associated with an operator console for the system,
instruction control means in the PC providing instrumentation control commands for the data processing system,
a command decoder being provided in each ITU,
a PC bus connecting the PC to the command decoder in each ITU in the system to transfer each instrumentation control command from the PC to each ITU in the system,
the instrumentation control means providing an enablement command on the PC bus to the distributed ITUs to enable and disable instrumentation operation in the system.

10. Internal system instrumentation monitoring means as defined in claim 9, further comprising:
rate control means connected to the sampling signal means to control the rate of the sampling signals.

11. Internal system instrumentation monitoring means as defined in claim 9, further comprising:
outputting means including an ITA output control means in each ITU to control the outputting of collected entries in the distributed ITUs, the ITA output control means connected to the PC bus to selectively output ITU collected entries from the different ITUs to the PC bus for storage by the PC.

12. Internal system instrumentation monitoring means as defined in claim 3, further comprising:
   the outputting means also outputting collected entries in the ITU and SAT as sychronized sets of collected entries on each outputting operation,
   the synchronized sets of collected entries from the plurality of ITU and SAT provided by the outputting means being related by their relative addresses.

13. Internal system instrumentation monitoring means as defined in claim 2, further comprising:
   another distributed hardware functional element in the system containing another ITU also connected to the sampling signal means, and
   common address reset means connected to all ITUs in the system to reset the addressing means in all ITUs to a predetermined address to synchronize the current address in all ITUs.

14. Internal system instrumentation monitoring means as defined in claim 13, the monitoring means further comprising:
   a channel processor in the system being another distributed hardware functional element containing an ITU.

15. Internal system instrumentation monitoring means as defined in claim 13, further comprising:
   a system control element (SCE) for coordinating storage requests from a CPU to a main storage in the system,
   the SCE being another distributed hardware functional element in the system containing an ITU.

16. Internal system instrumentation monitoring means as defined in claim 13, the monitoring means further comprising:
   a main storage controller element being another distributed hardware functional element containing an ITU.

17. Internal system instrumentation monitoring means as defined in claim 2, further comprising:
   a channel processor containing at least one ITU,
   a main storage controller containing at least one ITU,
   a system control element containing at least one ITU,
   common address reset means connected to all ITUs in the system to reset the addressing means in all ITUs to a predetermined address to synchronize the current addresses in all ITUs,
   the sampling signalling means being connected to the addressing means of all ITUs in the system to maintain address synchronism for the distributed ITUs by the sampling pulses simultaneously incrementing the addresses of the current entries in the ITUs.

18. Internal system instrumentation monitoring means as defined in claim 1, the connecting means for the input signals further comprising:
   means for also connecting an instruction address register in the CPU to an input of the ITA in order to provide an address of an executed instruction to the currently addressed entry in the ITA to enable the recording of selected instruction addresses in the ITA existing at the time of the sampling signals,
   the instruction addresses recorded in entries of the ITA enabling a correlation between software instructions represented by the instruction addresses and ITA hardware signals recorded in the same ITA entries.

19. Internal system instrumentation monitoring means as defined in claim 18, the system including a plurality of CPUs, the monitoring means further comprising:
   each CPU in the system having at least one ITU, the system having a plurality of distributed ITUs embedded in different parts of the system,
   common address reset means connected to all ITUs in the system to reset the addressing means in all ITUs to a predetermined address to synchronize the current addresses in all ITUs,
   the sampling signal means being connected to the addressing means of all ITUs in the system to maintain ITA address sychronism while simultaneously incrementing the addresses of the current entries in the ITAs,
   the outputting means selectively outputting sets of entries from all ITUs as synchronized sets of collected entries on each outputting operation,
   the synchronized sets of collected entries provided by the outputting means enabling a statistical analysis of interrelationships between the operations of the plural CPUs.

20. Internal system instrumentation monitoring means for a plurality of CPUs as defined in claim 19, further comprising:
   a plurality of SATs and TTs in a main storage of the system, each CPU having an associated SAT and an associated TT,
   accessing means for accessing a relative address for a current SAT entry in each of the plurality of SATs at the same relative address of a current ITA entry in each of the plurality of ITUs,
   the outputting means outputting collected entries in all ITUs and SATs as synchronized sets of collected entries on each outputting operation,
   the synchronized sets of collected entries outputted from the plurality of ITUs and SATs being related by their relative addresses.

21. Internal system instrumentation monitoring means for a plurality of CPUs as defined in claim 20 further comprising:
   a rate control command being providable by an operator controller on a controller bus to all ITUs in the system,
   sampling signal generating means in each ITU,
   a command decoder in each ITU for decoding the rate control command and having an output connected to the sampling signal generating means in each ITU to control the same sampling pulse rate in all ITUs in the system.

* * * * *

UNITED STATES PATENT AND TRADEMARK OFFICE
CERTIFICATE OF CORRECTION

PATENT NO. : 4,590,550
DATED : May 20, 1986
INVENTOR(S) : J. H. Eilert et al

It is certified that error appears in the above-identified patent and that said Letters Patent are hereby corrected as shown below:

Section [75] Inventors: The third joint inventor should read --JULIAN THOMAS--, not "THOMAS JULIAN"

Signed and Sealed this

Twenty-sixth Day of August 1986

[SEAL]

Attest:

Attesting Officer

DONALD J. QUIGG

Commissioner of Patents and Trademarks